May 5, 1959 G. H. HANNON ET AL 2,884,694
DEVICE FOR PRESSING AND MOLDING PLASTIC FOOD PRODUCTS
Filed March 22, 1956 2 Sheets-Sheet 1

INVENTORS
GILBERT H. HANNON
JOSEPH M. DENUCCI
BY Warren F. B. Lindsley
ATTORNEY.

May 5, 1959  G. H. HANNON ET AL  2,884,694
DEVICE FOR PRESSING AND MOLDING PLASTIC FOOD PRODUCTS
Filed March 22, 1956                        2 Sheets-Sheet 2

INVENTORS
GILBERT H. HANNON
JOSEPH M. DENUCCI
BY Warren F.B. Lindsley
ATTORNEY

United States Patent Office 2,884,694
Patented May 5, 1959

2,884,694

DEVICE FOR PRESSING AND MOLDING PLASTIC FOOD PRODUCTS

Gilbert H. Hannon, Green Bay, and Joseph M. De Nucci, Cumberland, Wis., assignors to L. D. Schreiber & Company, Inc., Green Bay, Wis.

Application March 22, 1956, Serial No. 573,163

13 Claims. (Cl. 31—30)

This invention relates to pressing and molding devices for plastic food products and more particularly to a new and improved pressing and molding device for forming blocks of cheese of substantially the same shape, size and weight.

Heretofore Mozzarella cheese masses were formed by hand by kneading warm balls of curd until an enclosing skin wrapping formed around the cheese mass. This skin wrapping formed by the cheese completely covered the cheese mass thereby preserving the cheese from the deteriorating effects of the atmosphere. The demand for Mozzarella cheese products has increased to the point where mass producing of blocks of skin covered cheese products of a constant weight is needed and demanded by the mechandiser.

Therefore, in accordance with the invention claimed, a new and improved cheese pressing and molding device is provided for forming blocks of skin covered cheese of substantially the same shape, size and weight from a given weight of cheese curd. The forming device comprises in combination a frame, means mounted on the frame for supporting an open container in which material is placed to be compressed and means for closing the container and compressing the material to cause the material to completely fill all corners of the forming device. Forming blades are mounted on the frame for penetrating the container to press the compressed material into a plurality of parts. Means are provided for actuating the blades to penetrate the container and for gradually reducing the pressure on the material. The blades press the material into masses of substantially the same size, shape and weight without rupturing the outer surface of the material. When the blades reach the bottom of the container they have pushed the skin on the upper surface of the material against the skin on the lower surface of the material and sealed the upper and lower skin surfaces together at that point. The blades then rupture the very thin film at the center of the sealed surface to separate the masses, however, retaining an unruptured skin surface around each cheese mass.

It is, therefore, one object of the present invention to provide a new and improved pressing and forming device for plastic food products.

Another object of this invention is to provide a new and improved cheese pressing and molding device in which cheese masses of substantially the same shape, size and thickness are formed from a given body of cheese curd.

A further object of this invention is to provide a new and improved cheese pressing and molding device in which cheese curd is molded into a plurality of similar size masses without rupturing the skin formed around each individual mass.

A still further object of this invention is to provide a new and improved machine in which curd of a given weight is molded into a plurality of parts of a particular size and weight without rupturing the skin surrounding each part.

Objects and advantages other than those above set forth will be apparent from the following description when read in connection with the accompanying drawings, in which.

Figure 1:
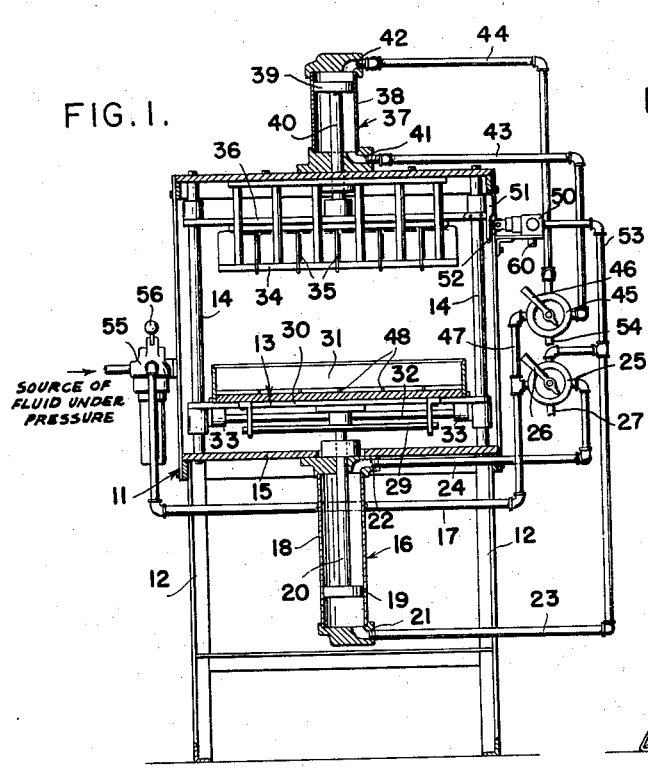
Fig. 1 is a view partly in cross section of a cheese pressing and molding device showing the movable platen in its lower retracted position and embodying the invention.

Referring more particularly to the drawings by characters of reference, Fig. 1 illustrates a machine for plastic food products such as Mozzarella cheese comprising a frame 11 forming a plurality of legs 12, a ram actuated movable platen 13 reciprocally mounted on a pair of guide rods 14, and a shelf 15 arranged below the movable platen 13 for supporting an actuating means for the movable platen 13 such as fluid actuating means 16. The actuating means 16 is illustrated as a fluid motor actuable in two directions by fluid under pressure, which will be assumed herein to be compressed air, supplied from a suitable compressor (not shown) through pipes 17. Although the actuating means 16 is herein shown as a fluid motor, an electric motor with suitable reversing means or hand operated linkage may also be used.

The fluid motor 16 comprises a cylinder 18, piston 19 and piston rod 20. Cylinder 18 is provided with orifices 21 and 22. Orifices 21 and 22 are connected by pipes 23 and 24, respectively, to a suitable valve 25. Valve 25, by means of a control handle 26, connects the source of fluid under pressure through pipes 17 to either pipes 23 and orifice 21, or pipes 24 and orifice 22, depending on the desired direction of operation of piston 19 and piston rod 20, as is well known in the art. A pipe 27 connected to valve 25 may be connected through a muffler (not shown) to atmosphere. Valve 25 connects cylinder 18, on one sdie of piston 19, of fluid motor 16, to the source of fluid under pressure and simultaneously connects cylinder 18 on the opposite side of piston 19 to pipe 27 to atmosphere. Fluid motor 16 is arranged for rapid reversal action by draining the downstream side of cylinder 18 to atmosphere upon actuation of fluid motor 16.

Motor 16 is provided to reciprocate the movable platen 13 mounted on the pair of guide rods 14. The movable platen 13, shown as reciprocating vertically, may equally well be reciprocated in any other direction and comprises a base plate 30 suitably connected to piston rod 20 and an open container 31. Container 31 comprises a rectangular box like member which is fixedly mounted on a rod 32 which is rotatably mounted on movable platen 13. The ends of rod 32 are inserted in bearings 33. When handle 29 of container 31 is rotated clockwise container 31 rotates ninety degrees or more to dump its contents.

The movable platen 13 when actuated upward by fluid motor 16 moves container 31 upward until a press element 34 is engaged. The press element 34 is intended to fit snugly into container 31 so as to effectively close container 31 and compress the material, such as cheese curd placed therein, to fill all of the corners and cavities of container 31 upon a predetermined upward movement of platen 13. Movably mounted on frame 11 so as to extend within suitable openings within the press plate or element 34 are a plurality of forming blades 35. Blades 35 are mounted on a base plate 36 which is reciprocally mounted on guide rods 14 and actuated by a fluid actuating means 37. The fluid actuating means 37 is illustrated as a fluid motor actuable in two directions by fluid under pressure such as compressed air supplied from a suitable compressor (not shown). Motor 37 may be an electric motor with suitable reversing means or hand operated linkage, if so desired.

The fluid motor 37 comprises a cylinder 38, piston 39 and piston rod 40. Cylinder 38 is provided with orifices 41 and 42. Orifices 41 and 42 are connected by pipes 43 and 44, respectively, to a suitable fluid reversing valve 45. Valve 45 by means of control handle 46 connects the source of fluid through pipes 17 and a pipe 47 to either pipes 43 or 44, depending on the desired direction of operation of piston 39 and piston rod 40 as is well known in the art. Valve 45 connects the cylinder 38 of fluid motor 37 on either one side or the other of piston 39 to atmosphere through the exhaust pipe 54 when the opposite side of cylinder 38 is supplied with fluid under pressure.

Figure 2:
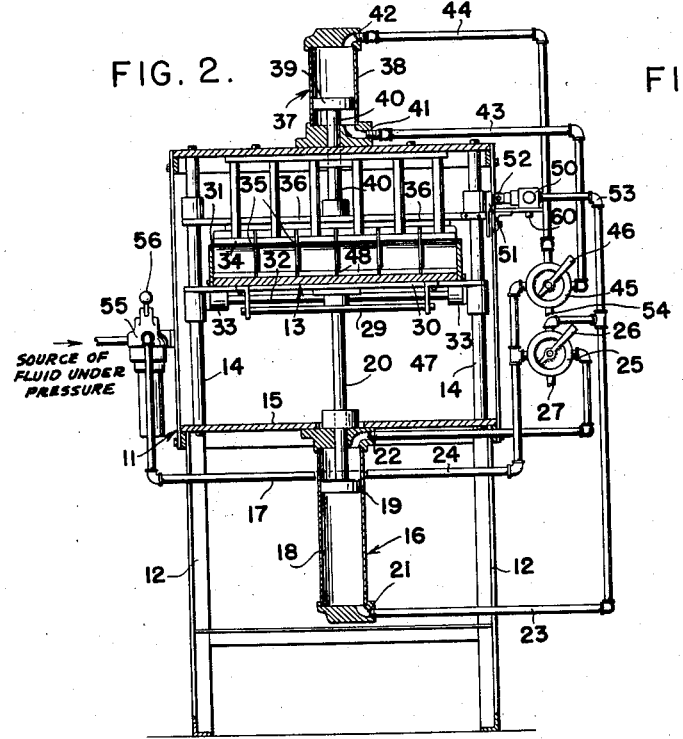
Fig. 2 is a view partly in cross section of the cheese pressing and molding machine illustrated in Fig. 1 and showing the movable platen in its upper cheese pressing and molding position.

The piston 39 and piston rod 40 connected to base plate 36 actuates the forming blades 35 from their uppermost position shown in Fig. 1, wherein the edges of the blades 35 are flush with the lower surface of the press element 34 to their lowermost position shown in Fig. 2 where the edges of blades 34 engage cooperating edges 48 in the bottom of container 31. If curd is placed in a container 31 and container 31 is actuated upward against press element 34, the curd is forced by press element 34 to completely fill all corners of container 31. While the curd is under pressure the movable blades 35 are actuated through the press element 34 by motor 37. Blades 35 if actuated their full stroke (i.e., to the bottom of container 31 as shown in Fig. 2) would cut through the outer skin of the cheese and through the cheese curd until they reached their cooperating cutting edges 48 arranged on the bottom of container 31. If this action occurred the mass of cheese curd then would be cut into a plurality of parts with the ruptured cheese mass exposing the inside portions of the curd to atmosphere.

Figure 11:
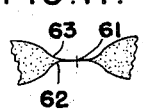
Fig. 11 is a view of the skin surface between cheese masses sealed on each side of the point of rupture.

In accordance with the invention claimed, a forming head is provided to press the curd placed in container 31 into a plurality of parts without rupturing the skin of the curd of each individual part. The forming head or movable platen comprises the base plate 36 and the forming blades 35. In order to accomplish this condition, it is necessary to reduce the pressure on the cheese curd as the blades 35 are forced through the press element 34. In this manner the edges of the blades push the curd into individual masses which are separated from each other only when the edges of the blades 35 meet the cooperating engaging edges 48 arranged on the bottom of container 31. At this joint the skin of the curd originally placed in container 31 is ruptured by the blades 34 and edges 48 but the skin completely surrounding each individual loaf remains unruptured, thereby protecting the interior of each loaf or mass from atmospheric conditions. Fig. 11 is an enlarged view of the cheese masses showing the sealed skin surfaces and the point of rupture.

The means of reducing the pressure on the curd placed within container 31 as the blades 35 are actuated through the press element 34 comprises a valve 50 which is actuated by a cam 51 as a roller 52 mounted on a valve stem of valve 50 rides over it. The cam 51 is mounted on the base plate 36 which forms a movable platen for blades 35. Valve 50 is mounted on frame 11 or on the pipes associated therewith so that as cam 51 moves past roller 52 of the valve stem of valve 50 the valve is opened to atmosphere enough to gradually reduce the pressure of piston 19 of fluid motor 16 on the press element 34 as the forming blades 35 are pressed into the curd placed in container 31. Valve 50 is of the usual stem operated type well known in the art and is biased in stem extended position by springs (not shown). The fluid under pressure in pipes 23 and 53 has actuated the piston 19 of motor 16 and the movable platen 13 together with container 31 to their upper position shown in Fig. 2. As the forming blades 35 are actuated downward into container 31 cam 51 is actuated into engagement with roller 52 of valve 50. As cam 51 passes by roller 52 the valve stem of valve 50 is moved inward toward the valve body thereby opening to atmosphere pipe 53 through exhaust pipe 60 and reducing the pressure on the downstream side of piston 19 of the dual purpose motor 16. As the pressure is reduced on piston 19 the container 31 drops back due to the pressure of the cutting blades moving through the cheese curd and the pressure differential on each side of piston 19 to reduce the pressure of the movable platen 13 upon press elements 34. If desired a predetermined amount of fluid under pressure may be forced from valve 25 through pipe 24 and into cylinder 18 above piston 19 at the time the forming blades 35 pass through the press element 34 and into container 31 during a cheese loaf forming operation. In this manner the reduction of pressure below piston 19 alone is not relied upon for reducing the pressure on the cheese curd.

In order to protect the operator's hands from being caught between the movable parts of the disclosed device a safety valve 55 comprising a hand operated means 56 is provided between the inlet pipes 17 and the source of fluid under pressure (not shown). The operator must use both hands to operate the pressing and molding device and thus cannot place his hands in the path of movement of the movable parts during actuation thereof.

In accordance with the invention claimed, a mass of cheese curd of a predetermined weight is placed within container 31. Upon rotation of handle 56 of valve 55 and a predetermined rotation of handle 26 of valve 25 fluid under pressure is forced through pipes 17, valves 25, pipes 23, orifice 21 and into cylinder 18 under piston 19. Simultaneously therewith fluid under pressure above piston 19 in cylinder 18 is exhausted through orifice 22, pipes 24, valve 25 and pipe 27 to atmosphere. The fluid under pressure actuates piston 19, piston rod 20, movable platen 13 and container 31 upward and into engagement with the press element 34. The pressure forcing piston 19 upward is of such a value that it presses the curd in container 31 against the press element 34 with such force that the curd completely fills all corners of the container 31.

At this time in the sequence of operation the operator moves spring biased handle 46 of valve 45 downward against its spring and fluid under pressure from pipes 17 flows through pipe 47, valve 45, pipe 44, orifice 42 and into cylinder 38 above piston 39. Simultaneously therewith fluid under pressure below piston 39 in cylinder 38 is exhausted through orifice 41, pipe 43, valve 45, exhaust pipe 54 to atmosphere. The fluid under pressure actuates piston 39, piston rod 40, base plate 36 and forming blades 35 toward press element 34 and the forming blades 35 are actuated through the blade opening in the press element 34 against the curd of cheese. As the blades 35 press against the cheese curd the cam 51 is forced against the roller 52 of valve 50 and valve 50 upon actuation of its valve stem toward the valve casing exhausts to atmosphere a predetermined amount of the pressure in cylinder 18 below piston 19 of motor 16. Piston 18 of motor 16 immediately moves downward a predetermined distance, toward orifice 21 thus reducing the pressure of press element 34 on the cheese curd enough to permit the forming blades 35 to press into the cheese curd until the blades reach the bottom of container 31. When the edges of blades 35 engage the edges of blades 48 they press and seal the skin on the upper surface of the cheese mass with the skin on the lower surface and then separate the masses formed by rupturing the skin of the seal to separate the masses from each other. The skin of the seal is ruptured in such a manner that each loaf or mass is completely wrapped by the skin of the original mass of cheese curd placed in container 31. Fig. 11 illustrates that the skin of the cheese curd is ruptured at a point 61 between the cheese masses and that portions 63 and 62 of the upper and lower skins of each mass is sealed on each side of the rupture.

Figure 4:
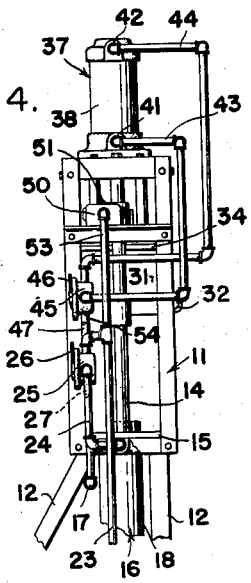
Fig. 4 is a right end view of the structure shown in Fig. 1 with the movable platen in the upper cheese pressing and molding position.

Upon deformation of the original mass of cheese curd into a plurality of smaller loaves or masses of cheese the operator releases the pressure on handle 46 of valve 45 and the handle moves back up to its horizontal position shown in Fig. 4. At this time the operator actuates the handle 26 of valve 25 counterclockwise to the position shown in Fig. 1. Fluid under pressure then flows from pipes 17 through pipe 47, valve 45, pipe 43, orifice 41, cylinder 38 to the underside of piston 39. Piston 39 is actuated upward with the simultaneous exhausting to atmosphere of that part of cylinder 38 above piston 39 through orifice 42, pipe 44, and exhaust pipe 54 of valve 45. Simultaneously with the actuation of piston 39 and blades 35 upward piston 19 of fluid motor 16 is actuated to move the movable platen 13 and container 31 to their lower position shown in Fig. 1. Fluid flows from pipes 17 through valve 25, pipe 24, orifice 22, cylinder 18 to the upper side of piston 19 to accomplish this action.

Figure 3:
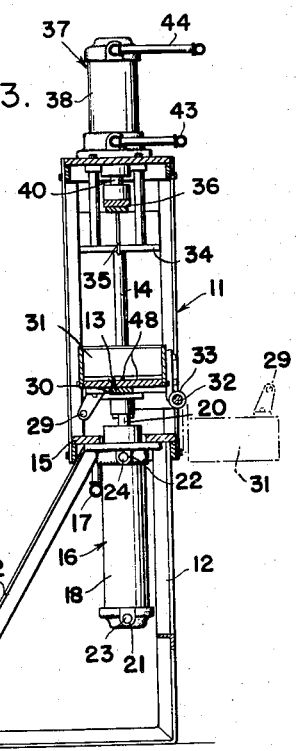
Fig. 3 is a partial right end view of the structure shown in Fig. 1 with the cheese container in dotted lines shown rotated 180 degrees to the cheese discharging position.

When container 31 is in its lower position and the container is full of loaves or masses of cheese of equal size, shape and weight, the container is rotated 180 degrees by lifting handle 29 of container 31 and rotates rod 32 within its bearings 33. In this manner the cheese loaves or masses may be dumped into a suitable container, salt bath or onto a conveyor as the situation may require. Fig. 3 illustrates in dotted lines the dumping position of container 31.

Figure 5:
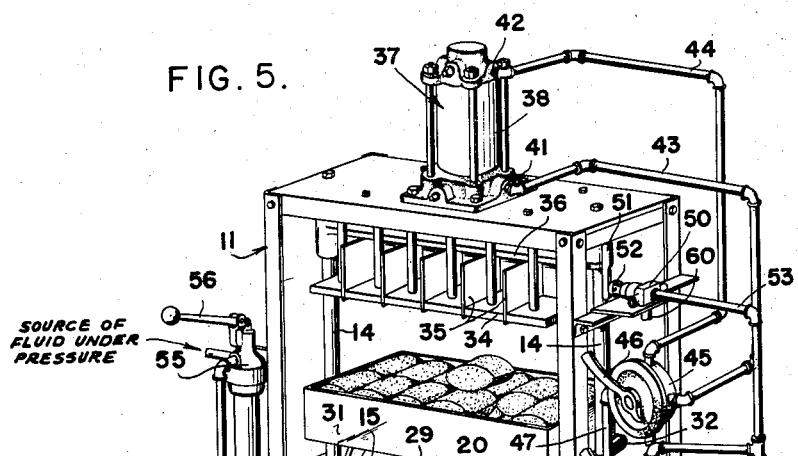
Fig. 5 is a perspective view of the cheese pressing and molding device illustrated in Fig. 1 with the movable platen in its lower position after a cheese pressing and molding operation and with a loaf of molded cheese removed from the container and place on end.

Figs. 4 and 5 illustrate in more detail the physical construction of one form of structure embodying this invention. Although Fig. 5 illustrates a square block of cheese with a rounded top which appears something like a miniature loaf of bread, this invention is not limited to any particular given shape or size of cheese. Elliptical balls of cheese may be readily manufactured with this invention by utilizing a container 31 which has a plurality of arcuate indentations in the bottom of the container thereby forming the curvature for the bottom portions of the cheese masses.

Figure 6:
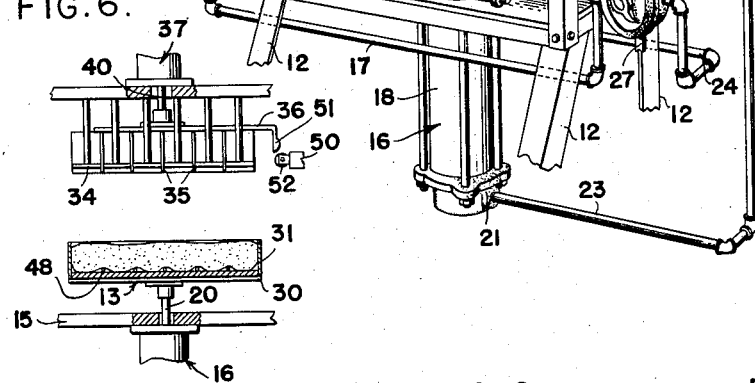
Figs. 6, 7, 8 and 9 illustrate sequentially the cheese pressing and molding operations.
Figure 7:
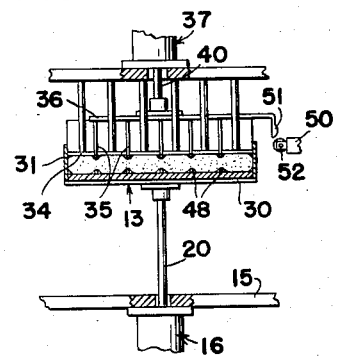
Figure 8:
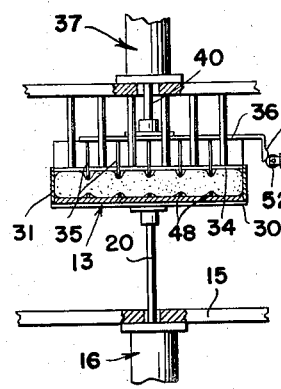
Figure 9:
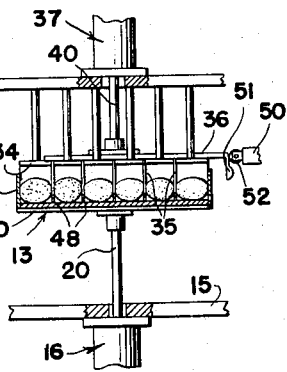

Figs. 6 to 9, inclusive, show the various phases of the cheese mass forming operations. Fig. 6 shows the container 31 being actuated upward toward the press element 34. The mass of cheese curd of a predetermined weight has been placed in the container. Fig. 7 shows the position of container 31 as the mass of cheese curd engages the press element 34. In Fig. 6 the forming plates are just starting to penetrate through the press element. As noted the cam 51 is about to engage roller 52 of the valve stem of valve 50. In Fig. 8 the forming blades 35 are being pressed into the mass of cheese curd without rupturing the outer skin of the cheese mass. At this point in the sequence of operation the cam 51 is being forced past roller 52 and in doing so actuates roller 52 and the valve stem inward toward the valve body of valve 50 to reduce the fluid pressure in cylinder 18 under piston 19 as heretofore explained. While piston 19 and container 31 slowly move downward blades 35 are pressed further into the mass of cheese curd and the plurality of loaves or masses of cheese of equal shape, size and weight are formed. Fig. 9 illustrates the forming structure at that point in its sequence where the forming blades 35 engaged the cooperating blades 48 to rupture the skin of the original cheese mass to form the plurality of smaller masses having skin surfaces completely surrounding each individual loaf of cheese.

Figure 10:
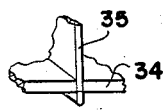
Fig. 10 is an enlarged partial perspective view of a cheese forming and cutting blade.

Fig. 10 illustrates an enlarged partial view of one type of forming blade 35. Any form of blade may be used in this molding and pressing device which performs the function desired.

This new and improved cheese pressing and forming device presses a plurality of cheese masses of any desired shape out of a larger mass of cheese curd while retaining the outer skin wrapping of the original cheese mass around each individual cheese loaf. These attractively formed cheese products, all of the same size and weight, may be shipped to a retailer in individual packages. In mass merchandising of cheese, this is a time and money saving feature over the prior art.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. A pressing and molding device comprising in combination a frame, means mounted on said frame for supporting an open container in which material is placed to be compressed, means mounted on said frame adjacent said container for closing said container and compressing the material into a predetermined shape, forming blades mounted on said frame for penetrating said container to press the compressed material into a plurality of parts, and dual purpose means mounted on said frame for actuating said blades to penetrate said container and for actuating said closing and compressing means to gradually reduce the pressure on the material, said blades pressing into the material without rupturing the outer surface thereof until said blades reach the bottom of said container.

2. A pressing and molding device comprising in combination a frame, means mounted on said frame for supporting an open container in which material is placed to be compressed, means mounted on said frame adjacent said container for closing said container and compressing the material into a predetermined shape, forming blades mounted on said frame for penetrating said container to press the compressed material into a plurality of parts, means mounted on said frame for actuating said blades to penetrate said container, and means mounted on said frame for gradually reducing the pressure on the material upon penetration of said blades in said container, said blades pressing into the material without rupturing the outer surface thereof until said blades reach the bottom of said container.

3. A pressing and molding device comprising in combination a frame, means mounted on said frame for supporting an open container in which material is placed to be compressed, the inside bottom of said container being provided with raised boundary portions, a press element mounted on said frame adjacent said container, means mounted on said frame for actuating said container in one direction toward said press element to close said container and compress the material into a predetermined shape, forming blades mounted on said frame for penetrating said container and engaging said boundary portions to press the compressed material into a plurality of parts, and means mounted on said frame for simultaneously actuating said blades to penetrate said container and for actuating said container actuating means in a second direction to gradually reduce the pressure of said press element on the material, said blades pressing into the material without rupturing the outer surface thereof until said blades reach the bottom of said container.

4. A pressing and molding device comprising in combination a frame, a movable platen mounted on said frame for supporting an open container in which material is placed to be compressed, a press element mounted on said frame adjacent said container, means mounted on said frame for actuating said movable platen toward said press element to close said container and compress the material into a predetermined shape, forming blades mounted on said frame for penetrating said container to press the compressed material into a plurality of parts, means mounted on said frame for actuating said blades to penetrate said container, and means mounted on said frame for gradually reducing the pressure on the material upon penetration of said blades in said container, said blades pressing into the material without rupturing the outer surface thereof until said blades reach the bottom of said container.

5. A pressing and molding device comprising in combination a frame, movable means mounted on said frame for supporting an open container in which pliable material is placed to be compressed, a press element mounted on said frame adjacent said container, means mounted on said frame for actuating said movable means toward said press element to close said container and compress the material into a predetermined shape, forming blades mounted on said frame for penetrating said container, means mounted on said frame for actuating said blades to penetrate said container, and means mounted on said frame for gradually reducing the pressure on the material as said forming blades penetrate said container, said blades pressing the material into a plurality of parts without rupturing the outer surface of each individual part.

6. A pressing and molding device comprising in combination a frame, a movable platen mounted on said frame, an open container in which material is to be compressed and formed mounted on said platen, a press element mounted on said frame adjacent the opening of said container, means mounted on said frame for actuating said movable platen toward said press element to close said container and compress the material into a predetermined shape, forming blades mounted on said frame for penetrating through said press element and into said container to press the compressed material into a plurality of parts, means mounted on said frame for actuating said forming blades to penetrate said press element and said container, and means mounted on said frame for moving said platen to gradually reduce the pressure on the material a predetermined amount upon penetration of said blades into said container, said blades pressing into the material without rupturing the outer surface thereof until said blades reach the bottom of said container.

7. A pressing and molding device comprising in combination a frame, a movable platen mounted on said frame, an open container in which material is to be compressed and formed mounted on said platen, a press element mounted on said frame adjacent the opening of said container, fluid motor means mounted on said frame for actuating said platen toward said press element to close said container and compress the material into a predetermined shape, forming blades mounted on said frame for penetrating through said press element and into said container to press the compressed material into a plurality of parts, means mounted on said frame for actuating said forming blades to penetrate said press element and said container, and means mounted on said frame for actuating said fluid motor to cause said platen to reduce the pressure on the material a predetermined amount upon penetration of said blades into said container, said blades pressing into the material without rupturing the outer surface thereof until said blades reach the bottom of said container.

8. A pressing and molding device comprising in combination a frame, a movable platen mounted on said frame, an open container in which material is to be compressed and formed mounted on said platen, a press element mounted on said frame adjacent the opening of said container, said press element being provided with a plurality of blade openings, a forming head mounted on said frame, said forming head comprising a base plate and a plurality of forming blades mounted on said base plate and extending into said openings of said press element, means mounted on said frame for actuating said movable platen toward said press element to close said container and press the material into a predetermined shape, said forming blades being arranged for penetrating into said container to press the compressed material into a plurality of parts upon actuation thereof, means mounted on said frame for actuating said forming blades to penetrate said container, and means mounted on said frame for moving said platen to gradually reduce the pressure on the material a predetermined amount upon penetration of said blades into said container, said blades pressing the material into a plurality of parts without rupturing the outer surface of each individual part.

9. A pressing and molding device comprising in combination a frame, a ram actuated movable platen mounted on said frame, an open container in which material is to be compressed and formed mounted on said platen, a press element mounted on said frame adjacent the opening of said container, said press element being axially aligned with said movable platen and being provided with a plurality of blade openings, a forming head mounted on said frame and axially aligned with said press element, said forming head comprising a base plate and a plurality of forming blades mounted on said base plate and extending into said openings of said press element, said forming blades being arranged for penetrating into said container to impress the compressed material into a plurality of parts upon actuation thereof, means mounted on said frame for actuating said movable platen toward said press element to close said container and compress the material into a predetermined shape, means mounted on said frame for actuating said forming blades to penetrate said container, and means mounted on said frame for moving said platen to gradually reduce the pressure on the material a predetermined amount upon penetration of said blades into said container, said blades impressing the material into a plurality of parts without rupturing the outer surface of each individual part.

10. A pressing and molding device comprising in combination a frame, a ram actuated movable platen mounted on said frame, an open container in which material is to be compressed and formed mounted on said platen, a press element mounted on said frame adjacent the opening of said container, said press element being axially aligned with said movable platen and being provided with a plurality of blade openings, a forming head mounted on said frame and axially aligned with said press element, said forming head comprising a base plate and a plurality of forming blades mounted on said base plate and extending into said openings of said press element, said forming blades being arranged for penetrating into said container to impress the compressed material into a plurality of parts upon actuation thereof, a first fluid motor means mounted on said frame for actuating said forming head toward said press element a predetermined distance to close said container and compress the material into a predetermined shape, a second fluid motor means mounted on said frame for actuating said forming blades to penetrate said container, and valve means mounted on said frame for synchronizing the action of said first and second motor means, said valve means gradually reducing the pressure of said first motor means on the material a predetermined amount upon penetration of said blades into said container, said blades impressing the material into a plurality of parts without rupturing the outer surface of each individual part.

11. A pressing and molding device comprising in combination a frame, a ram actuated movable platen mounted on said frame, an open container in which material is to be compressed and formed mounted on said platen, a press element mounted on said frame adjacent the opening of said container, said press element being axially aligned with said movable platen and being provided with a plurality of blade openings, a forming head mounted on said frame and axially aligned with said press element, said forming head comprising a base plate and a plurality of forming blades mounted on said base plate and extending into said openings of said press element, said forming blades being arranged for penetrating into said container to press the compressed material into a plurality of parts upon actuation thereof, a dual purpose fluid motor means mounted on said frame for actuating said platen in one direction toward said press element to close said container and compress the material into a predetermined shape and in a second direction to reduce the pressure on the material, a second fluid motor means mounted on said frame for actuating said forming blades to penetrate said container, and valve means mounted on said frame for actuating said dual purpose motor means in said second direction to cause said platen to gradually reduce the pressure on the material a predetermined amount and for actuating said second motor means to cause said blades to penetrate into said container upon actuation thereof, said blades pressing the material into a plurality of parts without rupturing the outer surface of each individual part.

12. A pressing and molding device comprising in combination a frame, a ram actuated movable platen mounted on said frame, an open container in which material is to be compressed and formed mounted on said platen, a press element mounted on said frame adjacent the opening of said container, said press element being axially aligned with said movable platen and being provided with a plurality of blade openings, a forming head mounted on said frame and axially aligned with said press element, said forming head comprising a base plate and a plurality of forming blades mounted on said base plate and extending into said openings of said press element, said forming blades being arranged for penetrating into said container to press the compressed material into a plurality of parts upon actuation thereof, a dual purpose fluid motor means for actuating said platen in one direction toward said press element to close said container and compress the material into a predetermined shape and in a second direction to reduce the pressure on the material, a second fluid motor means for actuating said forming blades to penetrate said container, and valve means mounted on said frame for sequentially actuating said dual purpose motor means in said second direction to cause said platen to gradually reduce the pressure on the material a predetermined amount and for actuating said second motor means to cause said blades to penetrate into said container upon actuation thereof, said blades pressing the material into a plurality of parts without rupturing the outer surface of each individual part.

13. A pressing and molding device for Mozzarella cheese and the like comprising a power elevatable base having thereon raised boundary portions, a plurality of power depressable forming blades above said base, said blades being complemental and opposed to said boundary portions, and compressor means adjacent to said blades and coacting with said base, whereby when a loaf of cheese or the like is placed on said base and the latter elevated against said compressor, the cheese or the like will be molded into desired shapes by said raised boundary portions and then severed and sealed thereon by said blades.

References Cited in the file of this patent
UNITED STATES PATENTS

| | | |
|---|---|---|
| 761,886 | Helm | June 7, 1904 |
| 2,054,720 | Cederholm et al. | Sept. 15, 1936 |
| 2,618,227 | Schmittroth | Nov. 18, 1952 |